United States Patent [19]
Jensen

[11] Patent Number: 4,731,965
[45] Date of Patent: Mar. 22, 1988

[54] ADJUSTABLE SHIM

[76] Inventor: Brian A. Jensen, P.O. Box 416, Rice Lake, Wis. 54868

[21] Appl. No.: 16,545

[22] Filed: Feb. 19, 1987

[51] Int. Cl.⁴ ............................................. B66F 13/00
[52] U.S. Cl. ................................. 52/126.1; 52/126.5; 254/104
[58] Field of Search ................. 52/126.1, 126.3, 126.5, 52/211, 215, 213; 254/104

[56] References Cited

U.S. PATENT DOCUMENTS

| | | | |
|---|---|---|---|
| 2,066,718 | 1/1937 | Dietz | 52/126.3 X |
| 2,239,433 | 4/1941 | Urbain | 52/126.5 X |
| 2,612,663 | 10/1952 | Pearse | 52/126.3 |
| 2,766,855 | 10/1956 | Johnson et al. | 52/126.3 |
| 3,338,555 | 8/1967 | Williams | 254/104 |
| 3,631,643 | 1/1972 | Jonell et al. | 52/126.5 |
| 4,014,146 | 3/1977 | Mascio et al. | 52/211 |
| 4,113,219 | 9/1978 | Mieyal | 254/104 |
| 4,625,489 | 12/1986 | Bögle | 254/104 X |

Primary Examiner—J. Karl Bell

[57] ABSTRACT

An adjustable shim is provided to be inserted between a fixed member and a movable member, in building construction, for spacing or orienting a movable frame member with respect to a fixed frame member. The adjustable shim, when a force is exerted against it, will incrementally expand to the desired dimension.

7 Claims, 8 Drawing Figures

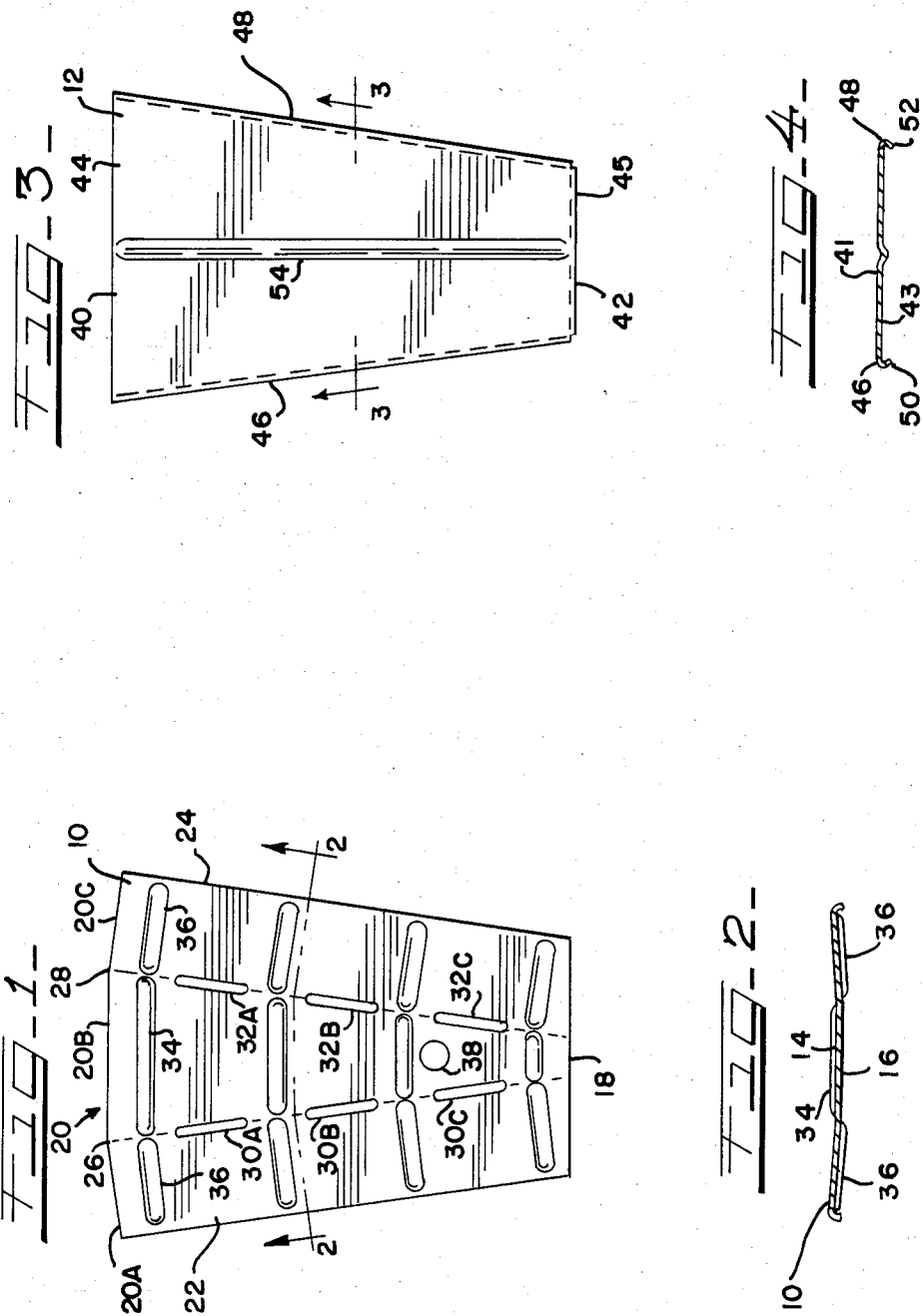

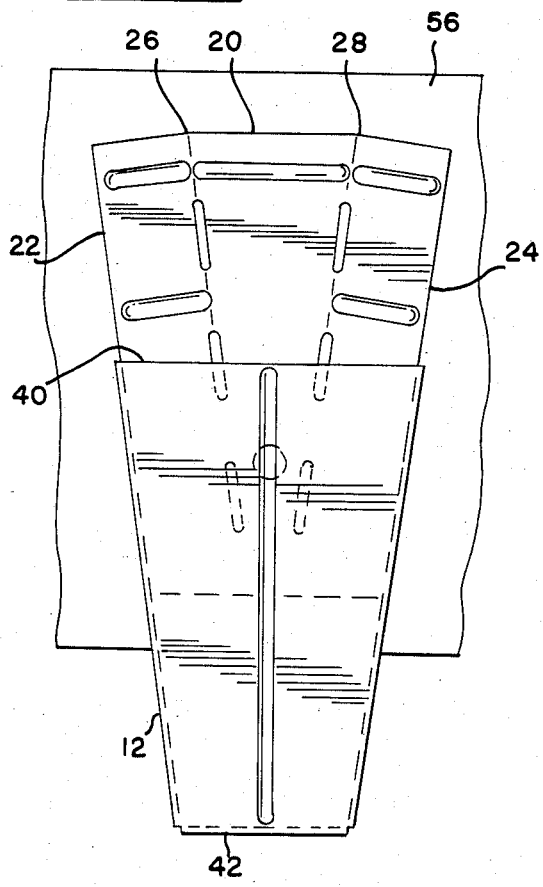
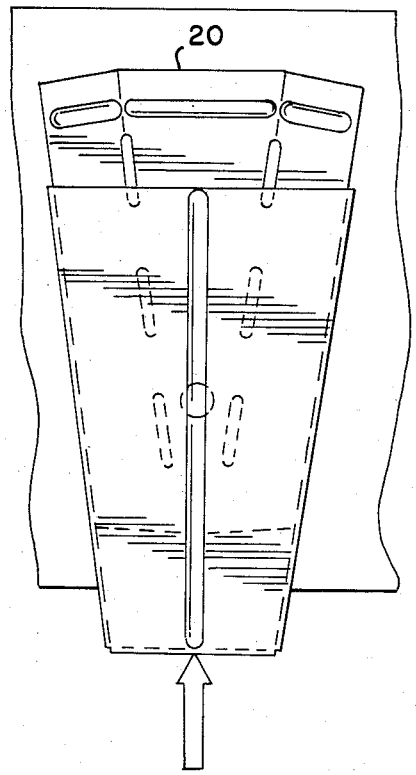
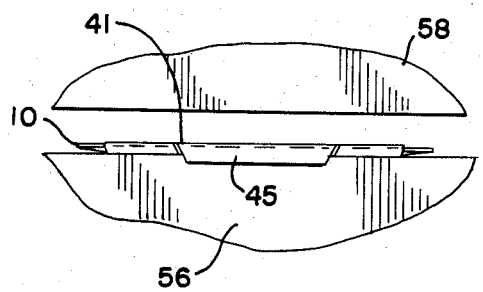
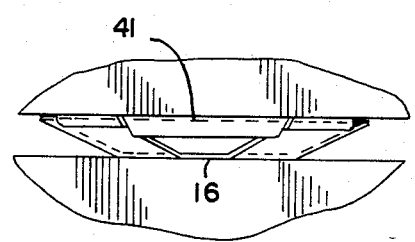

ADJUSTABLE SHIM

BACKGROUND OF THE INVENTION

The present invention relates to the field of adjustable shims, used most commonly in the construction industry, for spacing window or door frame units in the rough openings formed of lumber in a wall. The following United States patents disclose various arrangements for accomplishing such a result: U.S. Pat. Nos. 2,169,985, 2,651,814, 2,753,602, 2,997,750, 3,345,780, 3,614,846, 3,654,734, 4,014,146. None of these devices, however, provide a simple, inexpensive, two-piece unit which provides for incremental adjustment of the spacing without the use of tools other than a forceexerting member such as a hammer or block of wood.

SUMMARY OF THE INVENTION

The present invention consists of a two-piece adjustable shim including a base member and a slide member. The base member is formed of a flat piece of deformable metal with generally parallel end edges. The side edges of the base member diverge from each other from one end to the other. One or more lines of deformation are formed in the base member so that bending takes place along predetermined lines. The other piece of the adjustable shim consists of a slide member of the same general shape as the base member. The side edges of the slide member are designed to hook over the side edges of the base member and slide along it, when force is exerted, compressing and bending upwardly the side edges of the base member until the distance between the lower surface of the base member and the upper surface of the slide member approximates the predetermined spacing desired between the fixed frame unit and the movable frame unit.

BRIEF DESCRIPTION OF THE DRAWINGS

FIG. 1 is a front view of the base member of the present invention.

FIG. 2 is an end view of the base member taken along the lines 2—2 of FIG. 1.

FIG. 3 is a front view of the slide member of the present invention.

FIG. 4 is an end view taken along the lines 3—3 of FIG. 3.

FIG. 5 is a front view showing the slide member overlying the base member prior to the application of force.

FIG. 6 is an end view of the arrangement shown in FIG. 5.

FIG. 7 is a front view showing the slide member overlying the base member after the application of force.

FIG. 8 is an end view of the structure of FIG. 7.

DESCRIPTION OF THE PREFERRED EMBODIMENT

Illustrated in FIGS. 1 through 4 is a two-piece adjustable shim adapted to control the spacing between a fixed member and a movable member in a window or door frame unit. This shim system is also adaptable to other uses in construction, for example, in instances where trueness or perpendicular or other angular relationships are desired.

The adjustable shim consists of two elements, namely, a base member 10 illustrated in FIGS. 1 and 2 and a slide member 12 illustrated in FIGS. 3 and 4. The base member 10 consists of a substantially flat piece of deformable metal or other material having an upper surface 14 and a lower surface 16. A first end edge 18 is provided which is relatively straight in its lateral extent. A second end edge 20 is provided consisting of three interconnected segments 20A, 20B, and 20C. The first end edge 18 is narrower in width than the second end edge 20. A pair of side edges 22 and 24 extend between the end edges 18 and 20. The side edges 22 and 24 diverge linearly from each other from said first end edge 18 toward said second end edge 20.

A pair of deformation lines 26, 28 are formed in the base member extending between the first and second end edges. Any of a number of acceptable methods may be used to form the deformation lines. It is also possible to utilize a single, centrally located, deformation line if desired. The deformation lines shown in FIG. 1 include a plurality of longitudinally extending apertures 30A, 30B, and 30C aligned along the line of deformation 26, and corresponding apertures 32A, 32B, and 32C along the line of deformation 28. These longitudinally extending apertures 30 and 32 form the lines along which deformation will take place when a lateral force is exerted against the side edges 22 and 24 squeezing the edges toward each other. The lines of deformation are formed in the base member to create inherent weak spots causing deformation to take place along these lines.

The base member also includes stiffening ribs 34 and 36 formed at various locations in the base member substantially perpendicular to the deformation lines 26 and 28 to impart rigidity to the base member in a direction further implementing bending along the predetermined lines of deformation. In the preferred embodiment, the rib 34 extends upwardly from the upper surface 14 of the base member while the ribs 36 are pressed downwardly from the lower surface 16 of the base member. An aperture 38 is formed in the base member so as to coact with a nail, screw, or other fastener for securing the base member to the fixed member in the construction.

As best shown in FIGS. 3 and 4, a slide member 40 is provided consisting of a relatively flat metal plate of a shape generally similar to the shape of the base member. The slide member 40 includes an upper surface 41, a lower surface 43, and first and second end edges 42 and 44, respectively, with the first end edge 42 being narrower in width than the second end edge 44. It is important to the operation of the present invention that the second end edge 44 of the slide member is greater in width than the first end edge 18 of the base member, but is narrower in width than the second end edge 20 of the base member. The slide member 40 includes a downwardly extending lip 45 and a pair of side edges 46 and 48 diverging linearly from each other from the first end edge 42 toward the second end edge 44 in a manner similar to the orientation of the side edges 22, 24 of the base member 10. As best shown in FIG. 4, the slide member defines a hook or sleeve 50, 52 extending from each side edge 46, 48, respectively, and bent downwardly and inwardly to form a sleeve adapted to engage the corresponding side edges 22, 24 of the base member 10. A stiffening rib 54 is shown in FIG. 3 formed in the sleeve member extending longitudinally between the first end edge 42 and the second end edge 44 to impart rigidity to the sleeve member.

The operation of the adjustable shim of the present invention is best illustrated in FIGS. 5 through 8. This device is usable in the construction industry where carpenters require shims for spacing or otherwise orienting window frame units or door frame units in the rough openings formed of lumber in a wall. Other uses for the adjustable shim will become apparent to the user. For purposes of example, we will designate as 56 the fixed member representing the frame formed in a wall and, as 58, the movable member representing the side of the window frame unit. After the wall 56 is in place and it is desired to install a window or door frame unit in place with an appropriate spacing between the fixed and movable members, the base member 10 is affixed to the fixed member 56, as, for example, by nails, screws, or other commonly used fasteners. The fastener is positioned through the aperture 38 and extends into the fixed member 56. This secures the lower surface 16 of the base member flush with the outer surface of the fixed member. In this orientation, the entire base member 10 lies in a substantially flat plane.

Next, the slide member 12 is positioned in overlying relationship to the base member with the sleeves 50, 52 hooked over the corresponding side edges 22, 24 of the base member and acting in sliding, but gripping, engagement with same. The sleeve member is urged upwardly, as shown in FIG. 5, so that the second end edge 40 of the sleeve member moves as far toward the second end edge 20 of the base member as the dimensions of the elements readily allow. Due to the relative dimensioning of the slide member and the base member, there will come a point, as illustrated in FIG. 5, where the slide member 12 will move no further by the application of hand pressure. At this point, force is exerted, as illustrated in FIG. 7, by tapping the end edge 42 at the lip 45 of the sleeve member with a hammer or a block of wood. Alternatively, a block of wood may be disposed between the end edge 42 and the hammer or other force-applying member.

As the slide member 12 progresses from the orientation shown in FIG. 5 to the orientation shown in FIG. 7, the side edges 22 and 24 of the base member are squeezed inwardly and bent upwardly out of the plane of the base member along the lines of deformation 26, 28. The further the slide member 12 progresses toward the second end edge 20 of the base member, the more the side edges 22 and 24 are squeezed inwardly and bent upwardly along the lines of deformation. This is graphically illustrated by comparing FIG. 6 and FIG. 8. FIG. 6 shows the base member 10 lying generally in a single plane with approximately a one-half inch spacing between the upper surface 41 of the slide member and the movable member 58. FIG. 8 shows the upper surface 41 of the slide member abutting the movable member 58. The tapping process continues until the distance between the upper surface 41 of the slide member and the lower surface 16 of the base member has reached the predetermined spacing required between the fixed member 56 and the movable member 58, as shown in FIG. 8. The same process is then repeated on the other side of the framing unit until the door or window frame unit is appropriately located within the desired spacing. The door or window frame unit may now be nailed or otherwise fastened in place. Depending upon the dimensions of the unit being spaced or oriented, a plurality of shims may be required on one or both side walls or even on all four walls of the frame unit.

Thus, it has been shown that the present invention provides an adjustable shim for spacing of window or door frame units consisting of a simple, inexpensive, two-piece assembly. Various features of the invention have been particularly shown and described in connection with the illustrated embodiments of the invention, however, it must be understood that these particular arrangements merely illustrate and that the invention is to be given its fullest interpretation within the terms of the appended claims.

What is claimed is:

1. An adjustable, deformable, two-piece shim adapted to control the spacing between a fixed member and a movable member, said shim including a base member consisting of a substantially flat plate of deformable material with an upper surface, a lower surface, first and second end edges, said first end edge being narrower in width than said second end edge, a pair of side edges diverging linearly from each other from said first end edge toward said second end edge, and means defining at least one deformation line in said base member extedning between said first and second end edges, and a slide member consisting of a substantially flat plate with an upper surface, a lower surface, first and second end edges, said first end edge of said slide member being narrower in width than said second end edge of said slide member, said first end edge of said slide member being narrower in width than said first end edge of said base member, said second end edge of said slide member being greater in width than said first end edge of said base member, but narrower in width than said second end edge of said base member, such that at a predetermined point between said first end edge of said base member and said second end edge of said base member, the width of said base member is equal to the width of said second end edge of said slide member, the width of said base member increasing gradually between said predetermined point and said second edge member of said base member, a pair of side edges diverging linearly from each other from said first end edge toward said second end edge in a manner similar to the orientation of said side edges of said base member, and sleeve means defined at each side edges of said slide member adapted to engage said corresponding side edge of said base member and to be slidingly secured thereto, whereby when said second end edge of said slide member is positioned in overlying relationship to said first end edge of said base member and force is exerted on said first end edge of said slide member in a direction urging said second end edge of said slide member toward said second end edge of said base member, since the width of said second end edge of said slide member is narrower than the width of said base member between said predetermined point and said second end edge of said base member, said side edges of said base member are deformed along said deformation line such that said side edges are necessarily raised upwardly out of the plane of said base member thereby increasing the sapce between said lower surface of said base member and said upper surface of said slide member, said force being exerted until the distance between said bottom surface of said base member and said upper surface of said slide member has reached the predetermined spacing desired between said fixed member and said movable member.

2. An adjustable shim as in claim 1 including an aperture formed in said base member adapted to receive a fastener for securing said base member to said fixed member.

3. An adjustable shim as in claim 1 including a plurality of deformation lines formed in said base member extending between said first and second end edges.

4. An adjustable shim as in claim 1 in which said means defining said deformation line consists of a plurality of longitudinally aligned apertures formed in said base member extending between said first and second end edges.

5. An adjustable shim as in claim 3 in which each of said plurality of deformation lines are formed by a plurality of longitudinally extending apertures extending between said first and second end edges, each deformation line being substantially parallel to its adjacent side edge.

6. An adjustable shim as in claim 1 including a plurality of stiffening ribs formed in said base member substantially perpendicular to said deformation lines to add rigidity to said base member in a direction perpendicular to the predetermined lines of deformation.

7. An adjustable shim as in claim 1 including a stiffening rib formed in said sleeve member extending longitudinally between said first end edge and said second end edge to impart rigidity to said sleeve member.

* * * * *